United States Patent Office 3,178,074
Patented Apr. 13, 1965

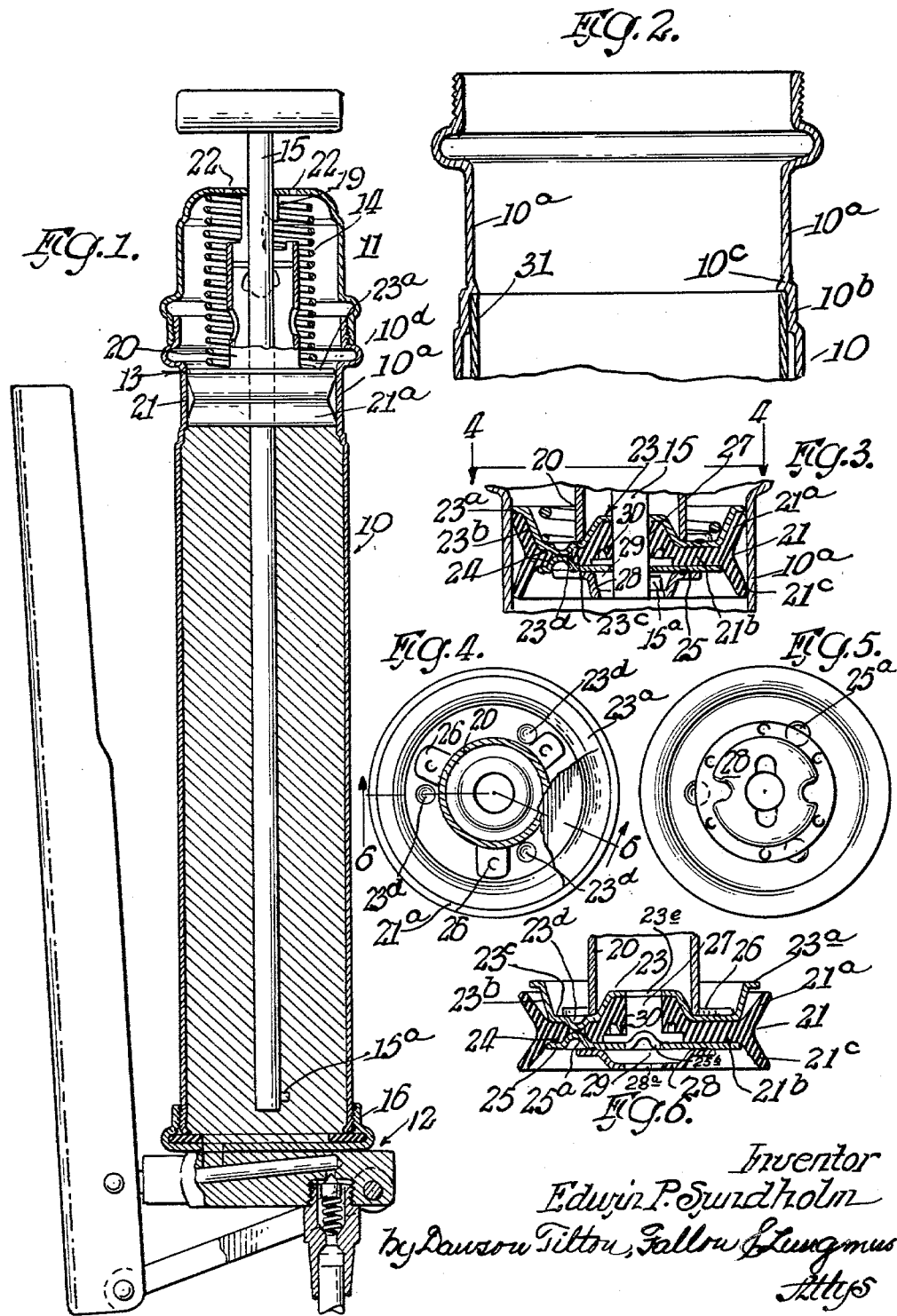

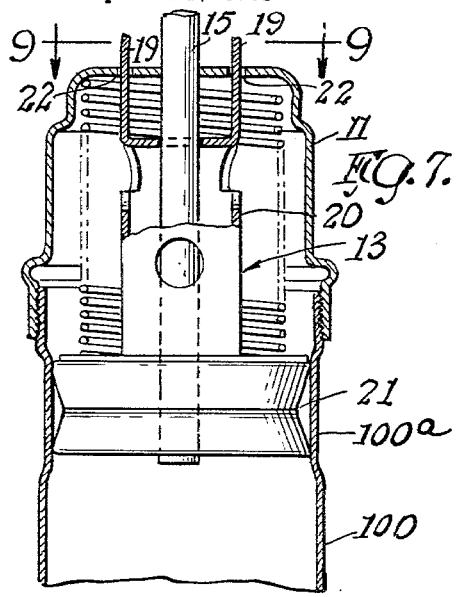
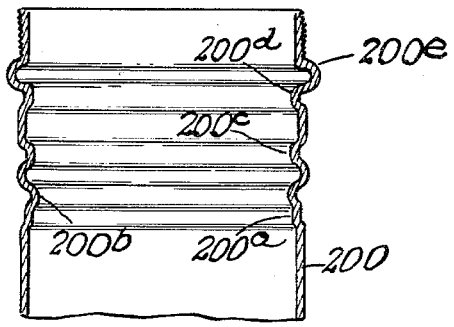
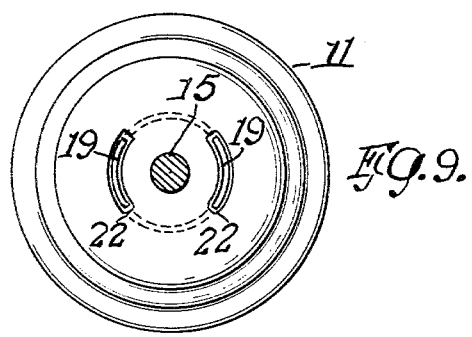
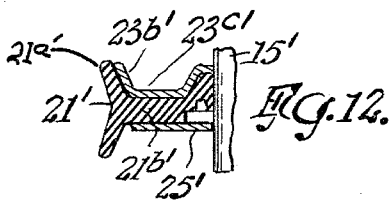
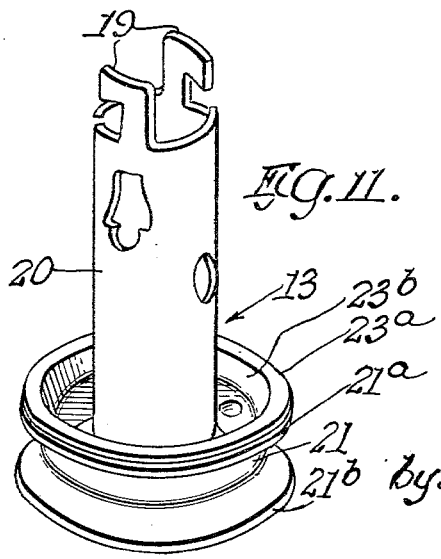
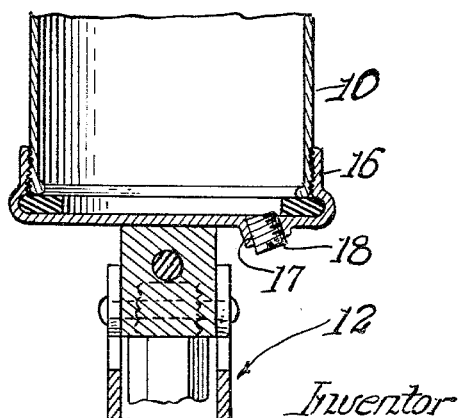

3,178,074
PRESSURE LOADING GREASE GUN
Edwin P. Sundholm, Albert City, Iowa
Filed Apr. 24, 1961, Ser. No. 105,211
4 Claims. (Cl. 222—386)

This invention relates to a pressure loading grease gun, that is, to a grease gun which is adapted for the pressure filling of the grease. The present invention also has particular utility with grease guns that are adapted for use with both cartridge-packaged greases and bulk-filled greases including the pressure filling of the grease.

Although cartridge-packaged greases are becoming more popular for use in lever-operated grease guns, bulk packaged grease is still the predominate way in which the grease is distributed for use in such grease guns. Various procedures are available for loading grease guns with bulk grease, including hand packing, suction filling, and pressure filling. One of the simplest and most widely used methods is that of pressure filling. In this method the grease is pumped into the barrel or grease container of the gun through an opening in the forward cap on which the dispensing head is mounted. As the grease is forced into the container under pressure it causes the slidable plunger assembly within the container to be displaced toward the rear of the container, and this will continue until the plunger assembly reaches the limit of its rearward movement. As the rearward movement of the plunger begins to be restricted, as may be the case before the plunger reaches the extreme limit of its rearward movement where the plunger is spring-urged, there is increasing tendency for the grease to force its way past or through the sealing elements of the plunger, thereby entering the space behind the plunger. This is highly objectionable since the bypassed grease will cover the spring and other elements behind the plunger, and may even flow out of the gun through openings in the rear cap. This would immediately lead to the soiling of the hands and clothes of the operator, and even if the grease remains within the rearward portion of the gun, the operator's hands will come in contact with the grease upon removing the rear cap, which is frequently done by for the inspection and servicing of the spring, plunger assembly, and other parts.

Heretofore grease guns have been subject to the deficiencies described above in connection with the pressure filling of greases, and this problem has been particularly acute where the grease guns are also designed for use with cartridge-packaged greases. With such constructions, the plunger sealing member must be contractible to a much greater degree than would otherwise be necessary, since it must be capable of sealingly engaging not only the wall of the grease container but also the wall of a grease cartridge inserted within the grease container. This greater degree of contractability, while desirable to permit the gun to be used with both cartridge-packaged greases and bulk-filled greases, tends to permit the grease to be forced past the sealing member somewhat more easily when the grease is being pumped into the gun under pressure.

It is therefore a general object of this invention to provide in a grease gun of the type described a novel plunger assembly and grease gun container which are constructed and arranged to prevent grease from being forced past the sealing element of the plunger when the gun is being pressure filled. A further object is to provide a grease gun incorporating the features just described which is also adaptable for use with cartridge-packaged greases. Additional objects and advantages will be indicated in the following detailed specification.

Illustrative embodiments of the present invention are shown in the accompanying drawing, in which:

FIGURE 1 is a side sectional view of a grease gun embodying the present invention;

FIGURE 2 is an enlarged fragmentary side sectional view showing the rear end portion of the grease gun cylinder or barrel of FIGURE 1 as it would appear with a grease cartridge inserted within the barrel;

FIGURE 3, an enlarged detail fragmentary side elevational view illustrating the relationship of the plunger assembly to the rearward portion of a grease gun barrel of reduced diameter;

FIGURE 4, a view of the rear or top of the plunger assembly;

FIGURE 5, a view of the front or bottom of the plunger assembly;

FIGURE 6, a fragmentary sectional elevational view of the plunger assembly;

FIGURE 7, an enlarged fragmentary side sectional view illustrating a modification of the grease gun of FIG. 1;

FIGURE 8, an enlarged fragmentary side sectional view showing the rear end portion of the grease gun cylinder, the construction representing a further modification;

FIGURE 9, a top or end view of the rear cap which may be used with any of the grease gun barrels illustrated in the foregoing figures;

FIGURE 10, a fragmentary enlarged side sectional view of the grease gun of FIG. 1 showing the forward end portion of the grease gun, the section being taken on a plane turned 90 degrees with respect to the plane of the section of FIG. 1;

FIGURE 11, a perspective view of the plunger assembly of the grease gun of FIG. 1; and FIGURE 12, a fragmentary sectional elevational view of a modified plunger assembly.

Referring now more specifically to the embodiments shown in FIG. 1, it can be seen that the grease gun includes a cylindrical grease container 10, a closure cap 11 threadedly connected to the rear of the container, and a grease dispensing head 12 removably mounted on the front end of the container. Within the container 10 is a slidable plunger assembly 13. Behind plunger assembly 13 is provided a compression spring 14, which urges the plunger assembly 13 toward the dispensing head 12. A plunger rod 15 is provided for the manual actuation of plunger assembly 13, the rod being releasably engageable with the plunger assembly for retracting, advancing, or rotating the assembly.

Dispensing head 12 includes a front end cap 16 which is threadedly connected to the forward end of cylinder 10. As shown in FIG. 10, cap 16 provides an inlet port 17 within which is threadedly seated a removable plug 18. With this construction, when it is desired to fill the grease gun with bulk grease by the pressure fill system, plug 18 is removed and the supply conduit from the grease pump is connected to port 17. As the grease is pumped into container 10, plunger assembly 13 will be forced toward the rear of the grease container until it reaches the position illustrated in FIG. 1. In the position shown in FIG. 1, the ears 19 which are provided by the rearwardly extending sleeve 20 of plunger assembly 13 will strike the inner end portion of rear cap 11, and this will check the further rearward movement of plunger assembly 13. Since the operator filling the grease gun cannot observe the movement of plunger assembly 13, however, it is very difficult to discontinue the pumping at the exact instant when the rearward movement of the plunger assembly is checked. Consequently, grease may be forced under considerable pressure against the sealing member 21 of the plunger assembly. As will subsequently be described in detail, however, the present invention provides means for preventing grease from being forced past the sealing member 21 into cap 11.

It will be noted that cap 11 is provided with slots 22. These slots are designed to receive the ears 19 of plunger sleeve 20 when the plunger assembly is rotated to a position with the ears in alignment with the slots.

The position of the plunger assembly 13 with the ears 19 extending through slots 22 is shown in FIG. 7 where the plunger assembly 13 in the cap 11 have the same construction as in FIG. 1, only the grease gun barrel 100 being of the modified construction, as will be subsequently described. The complementary arcuate shapes of the ears 19 and the slots 22 can be seen in FIG. 9, while FIG. 11 shows that the ears 19 are provided with laterally projecting portions which can be employed to latch the plunger assembly 13 in retracted position after the ears 19 have passed through the slots 22.

For present purposes, however, the important point is that the ears 19 may occasionally be in alignment with the slots 22 as the plunger assembly 13 approaches cap 11 during a pressure filling operation. When this occurs, the ears 19 will enter the slots 22 and the plunger assembly will be allowed to move somewhat further rearwardly before its motion is checked by the engagement of sleeve 20 with the inner end of cap 11. Thus, there are in effect two positions where the plunger assembly 13 may be stopped during the pressure filling of grease, as previously described. It is therefore desirable to provide means for preventing the leakage of grease past the sealing member 21 in both of these positions.

Turning now to a more detailed description of the plunger assembly 13, which necessarily has a special construction to adapt it for the present invention, reference is made to FIGS. 3 and 6 of the drawing. The sealing member 21 is formed of a resilient flexible material such as synthetic rubber, and is designed for engaging the inner walls of the grease container. As shown, sealing member 21 provides a rearward portion 21a of normally greater diameter than the internal diameter of grease cylinder 10. Preferably, sealing member portion 21a is in the form of an annular blade which extends outwardly and rearwardly, the blade being retractable from its normal position, as shown in FIG. 6 to the position shown in FIG. 3. In accordance with the present invention, the sealing member 21 should be retractable less than that of the normal internal diameter of grease cylinder 10.

In the illustration given, sealing portion 21a of sealing member 21 is integrally connected to a transversely extending web portion 21b which has a normal outside diameter smaller than that of the internal diameter of the cylinder 10. Sealing member 21 also provides a forwardly extending annular blade 21c, being contractible in the same manner as previously described for blade 21a. Sealing members such as member 21 are sometimes referred to in the trade as "double cup pistons," but such elements have not heretofore been used in the combination of the present invention.

In accordance with the present invention, a rigid back up washer 23 is carried by the plunger assembly 13 behind sealing member 21. Washer 23 provides an outer annular rim portion 23a adjacent the rearward portion 21a of sealing member 21. Rim portion 23a has an outer peripheral diameter which is smaller than the normal internal diameter of cylinder 10. As shown more clearly in FIGS. 3 and 6, rim portion 23a is arranged so that on contraction the rearward sealing member portion 21a is depressed beneath the rim portion in close proximity thereto. The fully depressed position of portion 21a is illustrated in FIG. 3.

The grease container 10 toward the rear thereof provides an annular portion 10a of reduced diameter. Preferably, as in the illustration given, container portion 10a is integral with the rest of the container. The internal diameter of annular container portion 10a is only slightly greater than the external diameter of washer rim portion 23a. With this arrangement, rim portion 23a cooperates with container 10a to maintain a tight seal when the sealing member 21 has been retracted under grease pressure to a position opposite the container portion of reduced diameter. The position shown in FIG. 1 is an example of this relationship, while the position illustrated in FIG. 7 is another. In both of these instances, the tubular sleeve 20 through ears 18 acts as a means for checking the rearward movement of the sealing member while maintaining the desired cooperative relation of the rim 23a and the container portion 10a. As shown more clearly in FIG. 3, in this relationship even if grease were forced past the forward blade 21c, an effective seal will be maintained between rearward blade 21a and container portion 10a. Preferably, back up washer 23 provides an annular portion 23b which extends forwardly from the inside edge of rim 23a. As shown more clearly in FIG. 3, the forwardly extending washer portion 23b is arranged to engage the inner wall of the rearward sealing member blade 21a when the blade is fully contracted. This prevents the blade portion 21a from being contracted to a diameter less than that of rim portion 23a.

In one preferred construction, the transversely extending web portion 21b of the sealing member provides a plurality of circumferentially spaced holes 24. With this construction, the back up washer 23 provides an integral transversely extending central portion 23c contacting and conforming to web portion 21b. Washer portion 23c is provided with a plurality of projections 23d. In the illustration given, web 21b provides three openings 24, and washer 23 provides three complementary projections 23d, as indicated in FIG. 4. Projections 23d extend into openings 24, as shown in FIGS. 3 and 6. Preferably, holes 24 are of substantially smaller diameter than the diameter of projections 23d so that a tight seal is obtained between web portion 21b and the central washer portion 23c, which washer portion also provides opening 23e (FIG. 6) for slidably receiving rod 15.

In the illustration given, another washer 25 is provided to engage the forward phase of web 21b, and the washer provides a plurality of rearwardly extending projections 25a which are received within the forward portion of openings 24, as indicated in FIG. 5 and shown more clearly in FIGS. 3 and 6. Projections 25a are preferably dimensioned to engage projections 23d, and the projections are united by spot welding, as indicated in FIGS. 3 and 6. Projections 25a are also preferably of slightly larger diameter than opening 24 to provide a tight seal. Washer 25 provides a central opening 25b (FIG. 6) for slidably receiving the rod 15.

To facilitate the assembly of the plunger, the forward end of sleeve 20 is provided with a plurality of laterally extending feet 26 which bear against the rear face of the central portion 23c of back up washer 23 and are secured thereto by spot welding, as indicated in FIGS. 3 and 6. The sealing member web portion 21b provides a central opening 27 for slidably receiving plunger rod 15, and the washers 23 and 25 also provide aligned openings through which the plunger rod extends. A retainer dome 28 is mounted on the forward face of washer 25 by spot welding, and this retainer also provides a central opening 28a (FIG. 6) for slidably receiving rod 15. The space 29 within retainer 28 is designed to cooperate with the laterally extending projection 15a on the forward end of rod 15 so that the plunger assembly may be releasably locked to the forward end of the rod, thereby permitting the plunger assembly to be advanced, retracted, or rotated.

As shown in FIGS. 3 and 6, it is preferred that sealing member web portion 21b provide a forwardly extending annular lip 30 around the forward end of opening 27 for engaging rod 15. Lip 30 is arranged so that grease pressing against the forward face of web 21b will tend to urge lip 30 into tight sealing engagement with rod 15.

The present invention can be used advantageously with grease guns which are adapted for both cartridge-packaged greases and bulk-filled greases. FIGURE 2 illustrates how the construction of FIG. 1 would be utilized with a grease cartridge, the grease cartridge being designated by the number 31. It will be noted that the side walls of the cartridge 31 are substantially in alignment with the container portion 10a of reduced diameter. Preferably, as described in copending application Serial No. 785,689, filed January 8, 1959, now Patent No. 3,059,819, the grease container 10 provides an inwardly formed portion 10b for receiving the upper end of grease cartridge 31 and holding the cartridge in centered relation within the barrel. It is also preferred to provide an inwardly projecting shoulder 10c between container portions 10a and 10b. The shoulder 10c is arranged to project over the rearward end of cartridge 31 protecting the edge of the cartridge and facilitating the entry of the sealing member 21 within the open rear end of the cartridge.

With the plunger assembly and grease container construction of FIGS. 1 to 6, the grease gun may be used with cartridge-packaged greases and all types of bulk-filled greases, including the suction filling and pressure filling procedures. As previously indicated, however, the grease gun is particularly designed for use with pressure-filled greases.

In FIGURE 7, there is shown a modification of the grease gun of FIG. 1 where the grease gun is adapted for use with bulk-filled greases including the pressure filling of grease, but not for use with cartridge-packaged greases. In this construction, the grease gun cylinder 100 is provided with a reduced diameter portion 100a like the reduced portion 10a of the FIG. 1 construction, but the cartridge holding portion 10a and the shoulder 10c are omitted. This construction is somewhat cheaper to manufacture where there is no interest in using the guns with cartridge-packaged greases. With the construction of FIG. 1, it is necessary to form the rearward portion of the barrel in two steps, first by a pinching operation, and then by a rolling operation. The construction of FIG. 1 can be formed in one step by a rolling operation.

FIGURE 8 illustrates another modified construction. This construction may be used with both cartridge-packaged greases and bulk-filled greases, and the inwardly formed portions of the barrel may be produced by a one step rolling operation. The external appearance of the FIG. 8 embodiment, however, may not be considered as attractive as the FIG. 1 embodiment.

More specifically, container 200 provides a cartridge centering portion 200a, a shoulder portion 200b and two portions of reduced diameter 200c, and 200d. The portions 200c and 200d perform the same function as the continuous reduced portion 10a of the embodiment of FIG. 1. The reduced portion 200c is positioned so that it is opposite the back up washer rim 23a when the ears 19 of sleeve 20 are in contact with the inside of cap 11. Similarly, the reduced portion 200d is positioned so that it is opposite the rim 23a when the ears 19 are extending through the slots 22 in cap 11.

To assure accurate relationship of the parts the embodiment of FIG. 8 also provides an outwardly extending annular ridge 200e against which the forward end of cap 11 will bear when the cap is in the correct position to assure the desired alignment of back up washer rim 23a respectively with either reduced portion 200c or 200d. This same arrangement is employed in the embodiment of FIG. 1 where the container provides an outwardly extending annular rim 10d to assure the correct relation of cap 11 to container 10.

FIGURE 12 illustrates a modified plunger assembly. The principal difference between the plunger assembly of FIG. 12 and that of FIG. 6 is that the rim of the back up washer is omitted. As shown in FIG. 12, the washer includes the central portion 23c', and the outwardly and rearwardly inclined portion 23b'. The rest of the parts are the same as in the FIG. 6 embodiment, and the corresponding elements have therefore been given the same numbers except that the numbers have been primed to indicate that they are applied to a modified construction.

In FIG. 12, the annular blade 21a' is shown in contracted position where it bears against the inclined annular wall 23b'. This would be the relationship with the parts when the plunger assembly is withdrawn into the reduced diameter portion of the grease gun barrel, such as the portion 10a as seen in FIG. 2. Thus in a pressure filling operation further inward movement of blade 21a' would be resisted as sealing engagement maintains.

While in the foregoing specification this invention has been described in relation to certain specific embodiments thereof, it will be apparent to those skilled in the art that the invention is susceptible to other embodiments and that many of the details described herein can be varied considerably without departing from the basic principles of the invention.

I claim:

1. In a grease gun adapted for the pressure filling of the grease, said grease gun being of the kind having a cylindrical grease container, a closure cap mounted on the rear of said container, a grease dispensing head assembly mounted on the front of said container and providing an inlet opening through which grease can be pumped under pressure into said container, and a slidable plunger assembly within said container including an annular sealing member of resilient, flexible material for engaging the inner walls of said container, said sealing member providing a rearward portion of normally greater diameter than the internal diameter of said cylinder and a portion forwardly thereof of lesser diameter than that of said cylinder, the said rearward portion of said sealing member being contractable to a diameter less than that of said cylinder, the improvement comprising a rigid back up washer carried by said plunger assembly behind said sealing member and providing a transversely-extending outer annular rim portion positioned immediately behind the said rearward portion of said sealing member, said rim portion having a diameter smaller than that of said cylinder and being arranged so that on contraction said rearward sealing member portion is depressed beneath said rim portion in close proximity thereto, said washer also providing an inclined annular portion extending forwardly from said rim portion along the inside face of said rearward sealing member portion, said container toward the rear thereof providing an annular portion of reduced diameter, the internal diameter of said annular portion being only slightly greater than the diameter of the said rim portion of said back up washer for cooperating with said rim portion and said rearward sealing member portion to maintain a seal when said sealing member has been retracted under grease pressure to a position opposite said container portion of reduced diameter, and stop means for checking the rearward movement of said sealing member while maintaining the said cooperative relation of said rim portion, said rearward sealing member portion, and said container portion of reduced diameter.

2. In a grease gun adapted for use with both cartridge-packaged greases and bulk-filled greases including the pressure filling of the grease, said grease gun being of the kind having a cylindrical grease container, a closure cap mounted on the rear of said container, a grease dispensing head assembly mounted on the front of said container and providing an inlet opening through which grease can be pumped under pressure into said container, and a slidable plunger assembly within said container including an annular sealing member of resilient, flexible material for engaging the inner walls of said container, said sealing member providing a pair of annular blades, one of said blades extending outwardly and forwardly and the other of said blades extending outwardly and rearwardly, said blades being of normally greater diameter than the internal diameter of said cylinder but being contractable to a diameter less than that of said cylinder, the improvement comprising a rigid back up washer carried by said plunger assembly behind said sealing member and providing a transversely-extending outer annular rim portion positioned immediately behind the said rearwardly extending blade of said sealing member, said rim portion having a diameter smaller than that of said cylinder and being arranged so that on contraction the rearward blade of said sealing member is depressed beneath said rim portion in close proximity thereto, said washer also providing an inclined annular portion extending forwardly from said rim portion along the inside face of said rearward sealing member portion, said container toward the rear thereof providing an integral inwardly formed annular portion of reduced diameter, the internal diameter of said annular portion being only slightly greater than the outer diameter of said washer rim portion for cooperating with said rim portion and said rearward sealing member blade to maintain a seal when said healing member has been retracted under grease pressure to a position opposite said container portion of reduced diameter, and stop means for checking the rearward movement of said sealing member while maintaining the said cooperative relation.

3. In a grease gun adapted for the pressure filling of the grease, said grease gun being of the kind having a cylindrical grease container, a closure cap mounted on the rear of said container, a grease dispensing head assembly mounted on the front of said container and providing an inlet opening through which grease can be pumped under pressure into said container, and a slidable plunger assembly within said container including an annular sealing member of resilient, flexible material for engaging the inner walls of said container, said sealing member providing a rearward portion of normally greater diameter than the internal diameter of said cylinder and a portion forwardly thereof of lesser diameter than that of said cylinder, the said rearward portion of said sealing member being contractable to a diameter less than that of said cylinder, the improvement comprising a rigid back up washer carried by said plunger assembly behind said sealing member and providing an outer annular rim portion positioned adjacent the said rearward portion of said sealing member, said rim portion having a diameter smaller than that of said cylinder and being arranged so that on contraction said rearward sealing member portion is depressed beneath said rim portion in close proximity thereto, said container toward the rear thereof providing an annular portion of reduced diameter, the internal diameter of said annular portion being only slightly greater than the diameter of the said rim portion of said back up washer for cooperating with said rim portion and said rearward sealing member portion to maintain a seal when said sealing member has been retracted under grease pressure to a position opposite said container portion of reduced diameter, and stop means for checking the rearward movement of said sealing member while maintaining the said cooperative relation of said rim portion, said rearward sealing member portion, and said container portion of reduced diameter, said stop means comprising a tubular member carried by said plunger assembly and extending rearwardly therefrom, said tubular member being arranged to engage the said closure cap on the rear of said container for checking the rearward movement of said plunger assembly, said tubular member also providing rearwardly extending ears at the outer end thereof and said closure cap providing cooperating slots for receiving said ears to check the rearward movement of said plunger assembly and to lock said plunger assembly in a fully retracted position, said ears also serving to check the rearward movement of said plunger assembly at a less than fully retracted position by striking said closure cap when not in alignment with said slots.

4. In a grease gun adapted for the pressure filling of the grease, said grease gun being of the kind having a cylindrical grease container, a closure cap mounted on the rear of said container, a grease dispensing head assembly mounted on the front of said container and providing an inlet opening through which grease can be pumped under pressure into said container, and a slidable plunger assembly within said container including an annular sealing member of resilient, flexible material for engaging the inner walls of said container, said sealing member providing a rearward portion of normally greater diameter than the internal diameter of said cylinder and a portion forwardly thereof lesser diameter than that of said cylinder, the said rearward portion of said sealing member being contractable to a diameter less than that of said cylinder, the improvement comprising a rigid back up washer carried by said plunger assembly behind said sealing member and providing an outer annular rim portion positioned adjacent the said rearward portion of said sealing member, said rim portion having a diameter smaller than that of said cylinder and being arranged so that on contraction said rearward sealing member portion is depressed beneath said rim portion in close proximity thereto, said container toward the rear thereof providing an annular portion of reduced diameter, the internal diameter of said annular portion being only slightly greater than the diameter of the said rim portion of said back up washer for cooperating with said rim portion and said rearward sealing member portion to maintain a seal when said sealing member has been retracted under grease pressure to a position opposite said container portion of reduced diameter, and stop means for checking the rearward movement of said sealing member while maintaining the said cooperative relation of said rim portion, said rearward sealing member portion, and said container portion of reduced diameter, said sealing member including an integral transversely extending web portion with a central opening therethrough, and said combination also including a plunger rod extending through the said central opening and slidably engaging the walls of said web portion around said opening, said web portion providing a forwardly extending annular lip around the forward end of said opening for engaging said rod, said lip being arranged so that grease pressing against the forward face of said web will tend to urge said lip into sealing engagement with said rod.

References Cited by the Examiner
UNITED STATES PATENTS

| | | | |
|---|---|---|---|
| 1,485,022 | 2/24 | Fesler | 222—390 |
| 2,361,126 | 10/44 | Klein | 222—386 X |
| 2,978,151 | 4/61 | Sundholm | 222—256 X |
| 2,985,495 | 5/61 | Neuman | 222—326 X |

RAPHAEL M. LUPO, *Primary Examiner.*

LOUIS J. DEMBO, *Examiner.*